United States Patent [19]
MacAller et al.

[11] Patent Number: 5,932,844
[45] Date of Patent: Aug. 3, 1999

[54] UNIVERSAL OCTAGONAL OUTLET BOX

[75] Inventors: Mark A. MacAller; Mark A. Bordwell, both of Memphis, Tenn.; Serge R. Michaud, Brossard, Canada

[73] Assignee: Thomas & Betts Corporation, Memphis, Tenn.

[21] Appl. No.: 08/901,961

[22] Filed: Jul. 29, 1997

[51] Int. Cl.[6] .................................................. H02G 3/18
[52] U.S. Cl. ............................. 174/65 R; 220/3.2
[58] Field of Search ................................. 174/65 R, 48, 174/49, 65 G, 50, 57; 220/3.2, 3.8, 241, 3.7

[56] References Cited

U.S. PATENT DOCUMENTS

| | | |
|---|---|---|
| 1,772,241 | 8/1930 | Calderwood . |
| 1,809,840 | 6/1931 | Fullman . |
| 1,820,626 | 8/1931 | Newman et al. . |
| 2,051,129 | 8/1936 | Clayton . |
| 2,329,109 | 9/1943 | Despard . |
| 2,659,765 | 11/1953 | Dunn ........................... 174/65 R |
| 2,667,368 | 1/1954 | Ferguson ........................ 285/154.4 |
| 2,686,065 | 8/1954 | Bergquist . |
| 3,049,585 | 8/1962 | Cochran ............................ 174/164 |
| 3,084,958 | 4/1963 | Appleton . |
| 3,491,974 | 1/1970 | Swanquist . |
| 3,575,313 | 4/1971 | Trachtenberg et al. . |
| 3,676,571 | 7/1972 | Rubinstein ........................ 174/65 R |
| 4,316,999 | 2/1982 | Nattel ................................ 174/65 R |
| 4,580,689 | 4/1986 | Slater . |
| 4,591,658 | 5/1986 | Bauer et al. ...................... 174/65 R |
| 4,666,055 | 5/1987 | Lewis . |
| 4,706,831 | 11/1987 | Williams, Jr. . |
| 4,889,453 | 12/1989 | Micco et al. . |
| 4,972,044 | 11/1990 | Kropa ............................... 174/65 R |
| 5,216,203 | 6/1993 | Gower .............................. 174/65 R |
| 5,726,385 | 3/1998 | Lowery et al. ..................... 174/50 |

*Primary Examiner*—Kristine Kincaid
*Assistant Examiner*—Dhiru R. Patel
*Attorney, Agent, or Firm*—Hoffmann & Baron, LLP

[57] ABSTRACT

An electrical outlet box including a bottom wall having a plurality of cable accommodating bottom wall openings and an upstanding side wall perimetrically bounding the bottom wall and including a plurality of cable accommodating side wall openings. The bottom wall and side wall define a box interior. A cable clamp is adjustably mounted within the box interior. The cable clamp allows restricted passage of the cable through the side wall openings while covering the bottom wall openings.

19 Claims, 8 Drawing Sheets

UNIVERSAL OCTAGONAL OUTLET BOX

FIELD OF THE INVENTION

The present invention relates to the field of metal electrical outlet boxes. More specifically, the present invention relates to a metal electrical outlet box which may be easily converted for use in both industrial installations and non-industrial installations.

BACKGROUND OF THE INVENTION

An electrical outlet box provides a termination point for wires carrying electrical current through buildings, houses, and other structures. Wiring entering an outlet box is typically connected to a particular electrical fixture such as a receptacle or switch. These fixtures may be mounted within the box for termination to an end extent of the wiring which is also inserted into the box. The box is then typically covered by a face plate having an opening therein to allow access to the receptacle outlet or the switch while preventing electrified components from being exposed. Outlet boxes may be employed in concealed-wiring installations in which they are located within a wall or ceiling. Alternatively, outlet boxes may be used in exposed-conduit wiring installations where they are exteriorly mounted to a wall, column or ceiling. For most electrical fixtures, the outlet box is spacious enough to accommodate sufficient length of excess wiring to allow a connected fixture to be removed from the outlet box and serviced without disconnecting the fixture from the wiring.

Outlet boxes are available in a variety of configurations and sizes. The selection of which type of box to use is dependant upon the specifics of the application. The particular configuration of the outlet box may depend on a combination of the specifics of the application and the governing electrical code at a worksite. Metal outlet boxes typically include wire insertion apertures in the form of "loom holes". Loom holes are insertion apertures, typically circular in shape, which provide a removable tab or "knockout" positioned thereover. The knockout is deflectably or removably connected to the outlet box and may itself may include a central aperture for inserting thinner wires therethrough.

To install the electrical fixture, an installer pulls one end of an electrical wire or cable, through a loom hole. An excess length of wire is pulled through the loom hole allowing for the electrical fixture to be attached to the conduit at a location outside the outlet box where the installer has more room to work. A metal clamp will be fastened over the inserted wire so as to prevent the wire from being pulled or falling out of the box. The free end of wire is connected to the electrical fixture which is then mounted adjacent the open face of the outlet box. The outlet box has sufficient volume and depth for excess wire to be packed into the box behind the fixture.

Often times, metal outlet boxes are manufactured and shipped having a metal clamp installed therein. The need to ensure a metal clamp remains in a metal box during shipping usually requires that a screw be inserted through the clamp and securely fastened through the box so that transportation vibrations will not shake the fastening screw loose from the box. Typically this is accomplished by fully installing a threaded screw fastener through both a clamp and box so that the clamp is tightly installed. However, once the box is installed at a worksite, an electrician or other worker will have to back each fastening screw outwards so that the clamp may be loosened enough to allow a wire to be installed through an aperture which it covers. Once enough wire has been pulled through the wire installer will tighten down on the clamp again to hold the wire in place. For worksites at which may such boxes are installed the task of backing out each fastening screw prior to the wires being inserted can become a laborious task adding to the time and cost for wiring the worksite.

Furthermore, the governing electrical code may dictate the number and size of wire insertion apertures. Such requirements are dictated by relevant certifying agencies such as Underwriters Laboratories (UL) and the Canadian Standards Association (CSA). Different applications require different standards for the outlet box's ability to contain sparks. For example, an outlet box for a residential application may have more wire insertion apertures than an outlet box for an industrial application. As a result of such directives, outlet boxes have been formed for industrial applications having a smaller number of wire insertion apertures than outlet boxes for, e.g. residential applications. Electrical parts manufacturers, suppliers, and installers must therefore provide and keep in supply of outlet boxes that meet the governing electrical codes for industrial applications and a separate supply of outlet boxes that meet the governing electrical codes for different applications.

It is desirable to provide metallic electrical outlet box that requires less installer time and effort to install. It is also desirable to provide a single metallic electrical outlet box that meets relevant codes while still preserving the available options to the installer depending on the particular application.

DETAILED DESCRIPTION OF THE INVENTION

Figure 1:
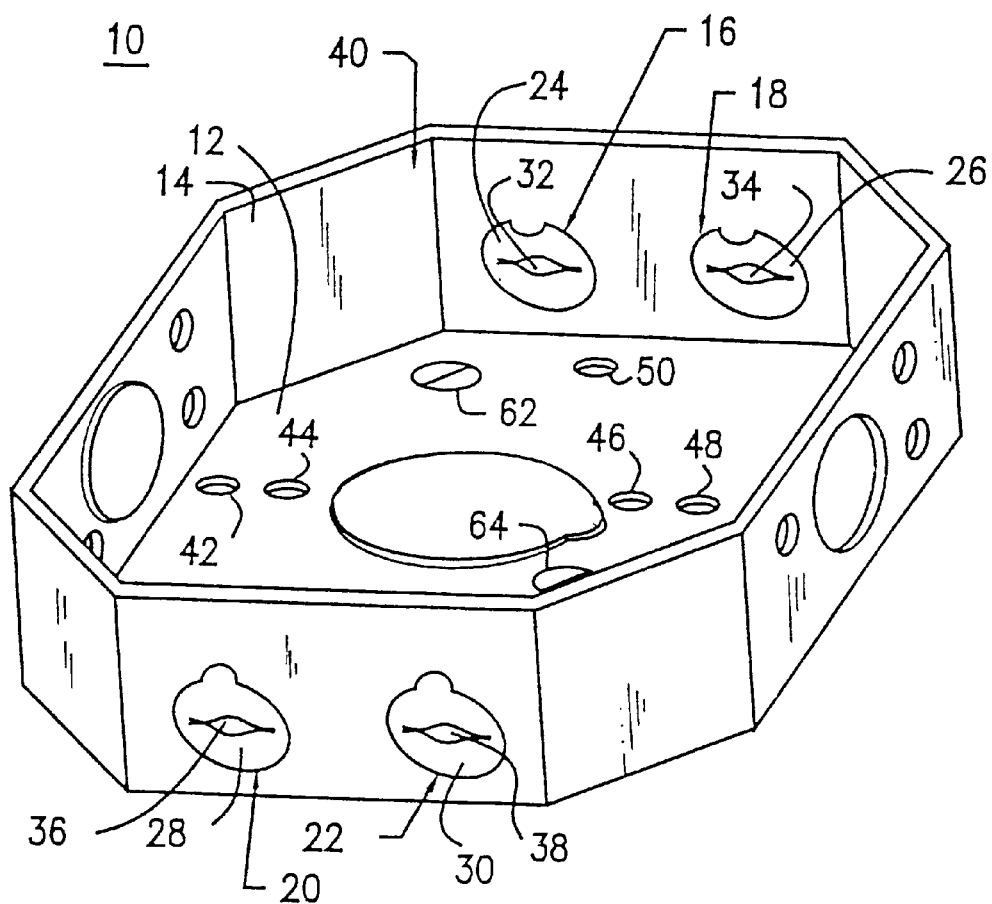
FIG. 1 is an isometric view of an electrical outlet box of the prior art that is particularly suited to industrial applications.
Figure 2:
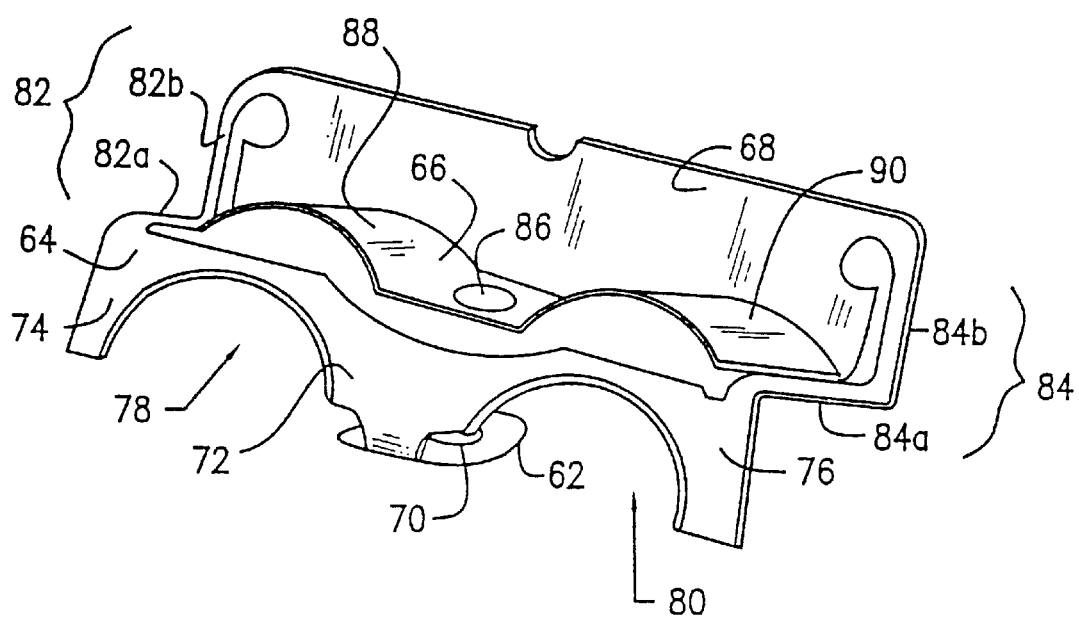
FIG. 2 is an isometric view of the clamp installed in the outlet box of FIG. 1.
Figure 3:
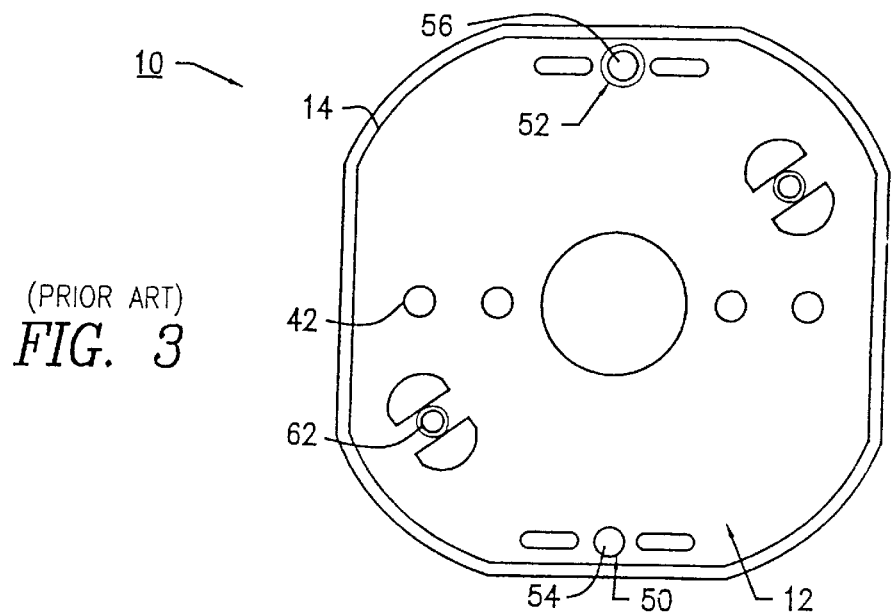
FIG. 3 is a front plan view of an electrical outlet box of FIG. 1.

FIGS. 1–6 show metallic outlet boxes and their associated clamps of the prior art which may be replaced by a single box of the present invention. With reference to FIGS. 1, 2, and 3, prior art outlet box 10 includes a bottom wall 12 which is perimetrically bounded by an upstanding octagonal side wall 14. Side wall 14 includes adjacent loom holes 16 and 18 in spaced opposition across bottom wall 12 from adjacent loom holes 20 and 22. Each of loom holes 16, 18, 20, and 22 have a knockout 24, 26, 28 and 30, respectively, positioned in registry thereover. Each knockout 24, 26, 28, and 30 includes a centrally-located aperture 32, 34, 36, and 38, respectively, therethrough for accommodating thinner wires (not shown), or for allowing e.g. a screwdriver to deflectably engage the knockout, for insertion into the box interior 40 defined by side wall 14.

Bottom wall 12 includes mounting holes 42, 44, 46, and 48 for accommodating a fastening device such as a screw or nail (not shown) for mounting box 10 during installation to a wall, stud, or the like. Bottom wall 12 also includes clamp mounting holes 50 and 52 for receiving a clamp fastener screw 54 and 56, respectively. Clamp mounting holes 50 and 52 are positioned on bottom wall 12 so as to extend normal to, and in between, loom holes 16, 18, and 20, 22, respectively. Clamp fastener screws 54 and 56 fasten clamps 58 and 60, respectively in box interior 40 thereby enabling clamps 58 and 60 to securely retain a conduit (not shown) inserted into box 10. Bottom wall 12 may also include screws 62 and 64 inserted therethrough.

Clamp 60 is formed from a stamped sheet of sheet metal. Clamp 60 provides variable closure of adjacent loom holes located on side wall 14 to effect clamping retention of a conduit inserted therethrough. With reference to FIG. 2, clamp 60 provides a footer 62, a front face 64, a clamp seat 66 and a head wall 68. Footer 62 is centrally located and defines a footer aperture 70 to be placed in registry with one of clamp mounting holes 50 or 52 on bottom wall 12. Conduit inserted through side wall 14 passes above and to either side of footer 62.

Footer 62 is contiguous with the central portion 72 of front face 64 which is bent to extend substantially parallel to side wall 14. Front face 64 provides longitudinally opposed bracing legs 74 and 76 to either side of central portion 72 to define conduit apertures 78 and 80 through which inserted conduit passes into interior 40. Front face 64 is bendably contiguous with head wall 68 via deflectable arms 82 and 84. In an undeflected condition, deflectable arms 82, 84 include a first portion 82a, 84a, which extends substantially perpendicular to both front face 64 and head wall 68, and a second portion 82b, 84b which extends substantially co-planar with head wall 68.

Clamp seat 66 protrudes substantially perpendicularly from head wall 68 towards front face 64. Clamp seat 66 includes a centrally-located seat aperture 86 in registry with footer aperture 70 for accommodating clamp fastener screws 56 and 58 in securing clamp 60 to box 10. Clamp seat 66 includes a pair of mounds 88 and 90 formed therein to generally conform to the outer surface of a conduit inserted though side wall 14.

In operation, clamp 60 may be loosely secured to bottom wall 12 by a clamp fastener screw so as to allow a conduit to be inserted through the adjacent loom holes. Once the conduit is inserted therepast, the clamp fastener screw may be further tightened down upon to deform clamp 60 into secure engagement with the inserted conduit. As the fastener screw is tightened, clamp seat 66 is driven towards the inserted conduit, causing deflectable arms 82 and 84 to deform and allow front face 64, clamp seat 66, and head wall 68 to generally maintain their undeflected alignment. Once the fastener screw is sufficiently tightened to secure the conduit between clamp seat 66 and bottom wall 12 the installer may proceed to other duties.

Box 10, which provides loom holes only through side wall 14, is suited for industrial applications because it meets the stricter standards imposed by governing electrical codes with respect to the ability of an outlet box to retain sparks emanating from therein. Certain governing electrical codes effectively limit the number of available insertion apertures so as to ensure that the box is better able to retain electrical sparks which may emanate from the fixture or wiring in the box. A smaller number of insertion apertures results in less possible directions from which a conduit may be inserted into the box interior, thereby limiting the options for installation by the installer.

Figure 6:
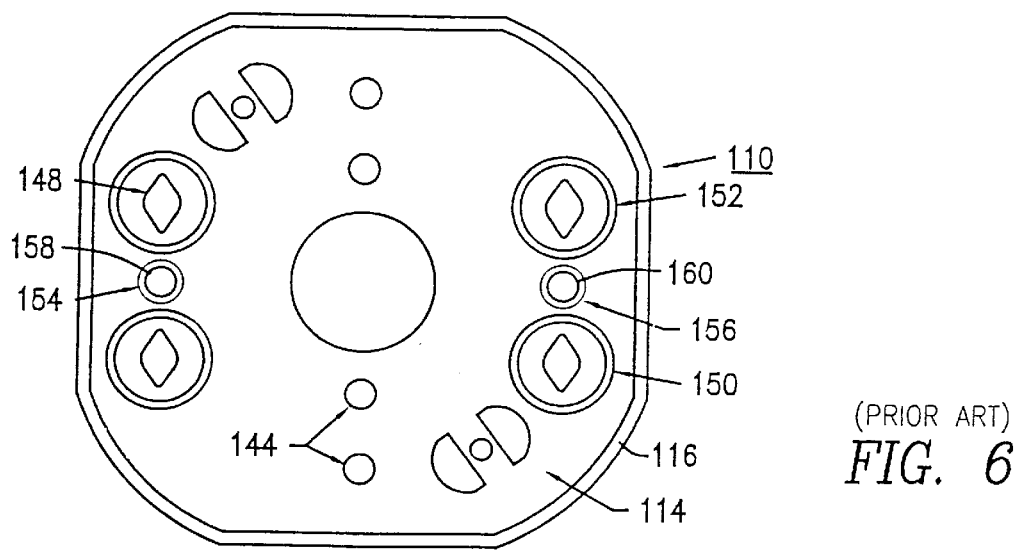
FIG. 6 is a front plan view of an electrical outlet box of FIG. 4.
Figure 4:
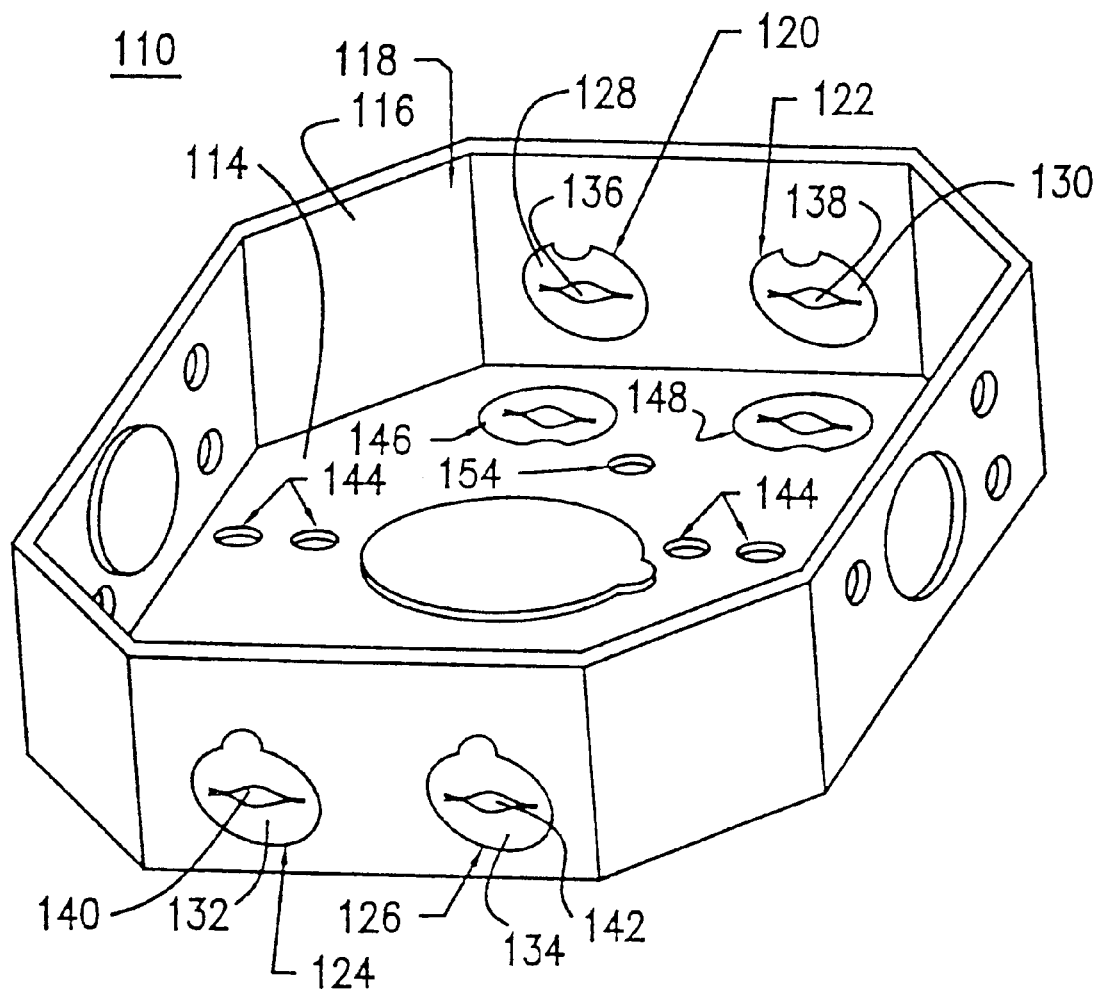
FIG. 4 is an isometric view of an electrical outlet box of the prior art that is particularly suited for non-industrial applications.
Figure 5:
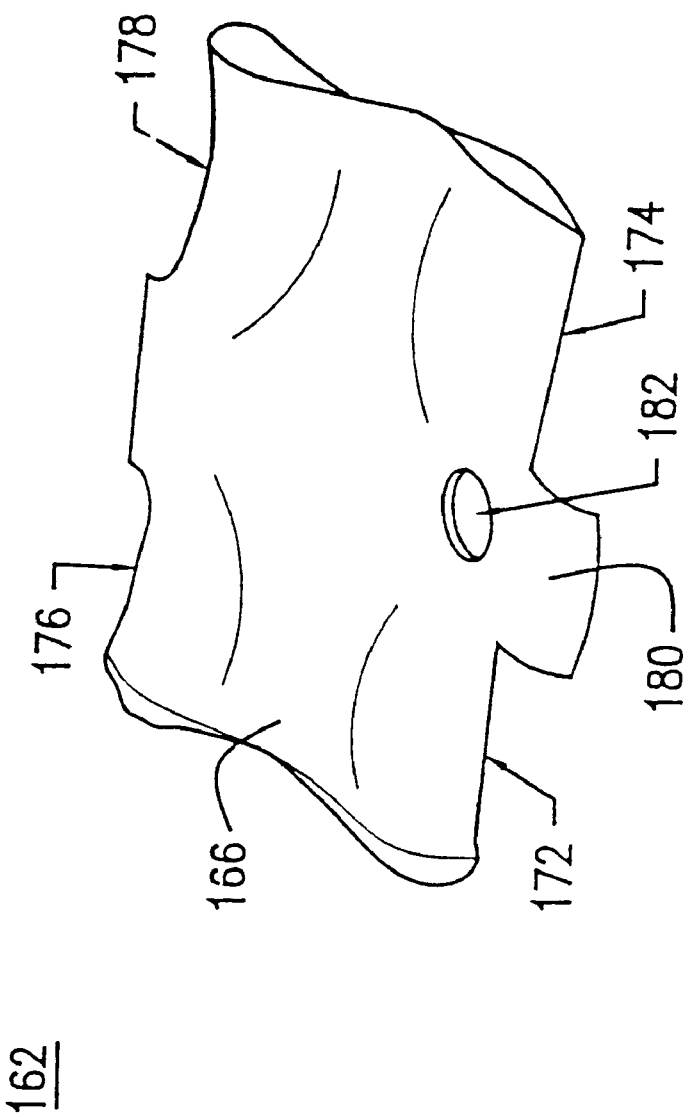
FIG. 5 is an isometric view of the clamp installed in the outlet box of FIG. 4.

FIGS. 4, 5, and 6 show another embodiment of a metallic electrical outlet box 110 and a clamp 112 therefore of the prior art. Box 110 includes a bottom wall 114 that is perimetrically bounded by a sidewall 116 to define a box interior 118. Side wall 116 includes a first pair of loom holes 120 and 122 in spaced opposition across bottom wall 114 to loom holes 124 and 126. Loom holes 120, 122, 124, and 126 are identical to the loom holes 16, 18, 20, and 24 in that each include a knockout 128, 130, 132, and 134, respectively, in registry therewith. Each knockout 128, 130, 132, and 134 similarly includes an aperture 136, 138, 140, and 142, respectively, therethrough. Side wall 116 may also include a plurality of mounting holes 144 for accommodating mounting hardware (not shown) such as screws or nails or the like.

Bottom wall 114 also includes a plurality of mounting holes 144 for accommodating mounting hardware (not shown). Bottom wall 114 further includes loom holes 146 and 148 adjacent and normal to loom holes 120 and 122 of side wall 116, and loom holes 150 and 152, adjacent and normal to loom holes 124 and 126. Clamp mounting holes 154 and 156 are positioned between loom holes 146, 148, and 150, 152, respectively for receiving clamp fastener screw 158 and 160, respectively. Clamp mounting holes 154 and 156 are positioned on bottom wall 114 so as to extend normal to, and in between, loom holes 120, 122, and 124, 126, respectively. Clamp fastener screws 158 and 160 fasten clamps 162 and 164, respectively in box interior 114 thereby enabling clamps 162 and 164 to securely retain a conduit (not shown) inserted into box 110. The sloping angle of clamp face 166 of clamp 162 will pin an inserted conduit against side wall 116 when inserted through bottom wall 114 and against bottom wall 114 when inserted through side wall 116. Bottom wall 114 may also include screws 168 and 170 inserted therethrough.

With reference to FIG. 5, clamp 162 provides for clamping conduit inserted into box 110 through any of the loom holes located on bottom wall 114 and side wall 116. Clamp 162 is stamped from sheet metal to provide a generally planar member having arcuate edge portions 172, 174, 176, and 178 for securely engaging a conduit inserted therepast. Clamp 162 includes a bottom wall engaging tab 180 adjacent a clamp aperture 182. Clamp aperture 182 is positioned in registry with a mounting hole 154, 156 and accommodates a clamp fastener screw for securely retaining clamp 112 with box 110. A conduit inserted through any of the loom holes may be threaded between either bottom wall 114 and one of arcuate edge portions 172, 174 or side wall 116 and one of arcuate edge portions 176, 178. Tightening down upon the clamp fastener screw results in clamp 112 securely engaging the conduit inserted therepast.

Box 110 is not suited for industrial application because it includes loom holes 146, 148, 150, and 152 located on bottom wall 112 in addition to the loom holes on side wall 114. The number of apertures results in too much space through which sparks may escape from the outlet box. Other installation applications, such as for residential units, do not have as strict a requirement regarding the total free space through the outlet box. For these other installations for which box 110 meets the governing electrical code, box 110 offers greater flexibility to the installer, than e.g. outlet box 10, as box 110 provides a greater selection of loom holes which increases the possible directions from which a conduit may be inserted into the box interior.

Figure 7:
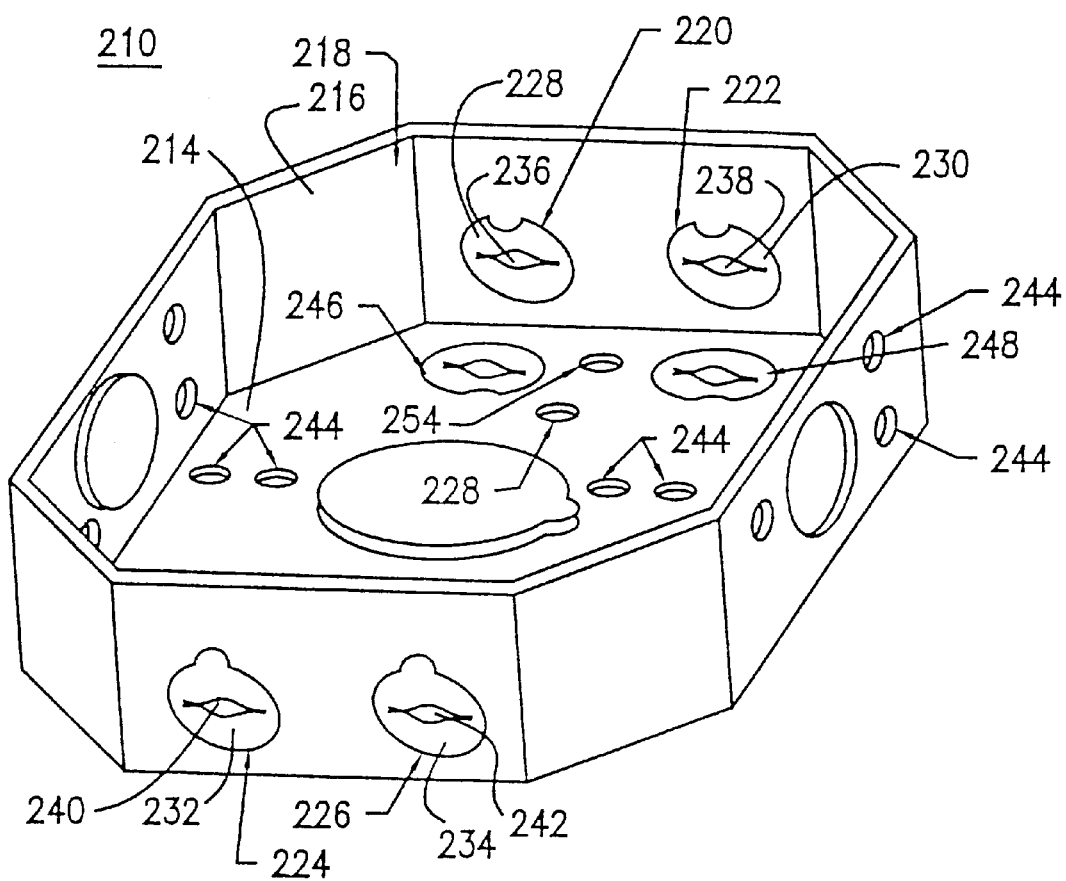
FIG. 7 is an isometric view of the electrical outlet box of the present invention.
Figure 8:
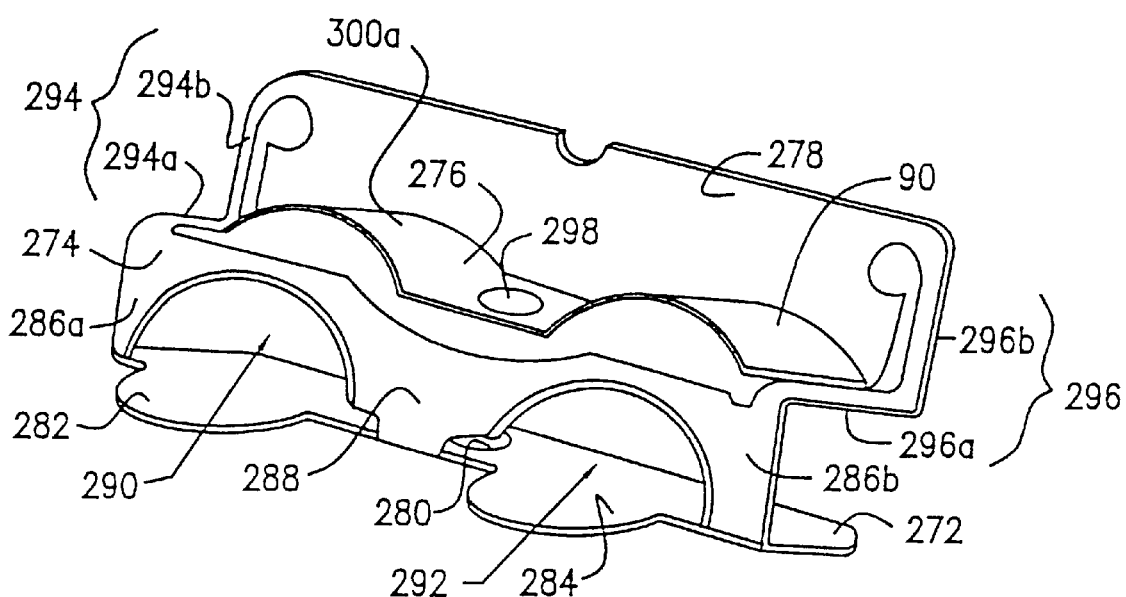
FIG. 8 is an isometric view of the clamp installed in the outlet box of FIG. 7.
Figure 9:
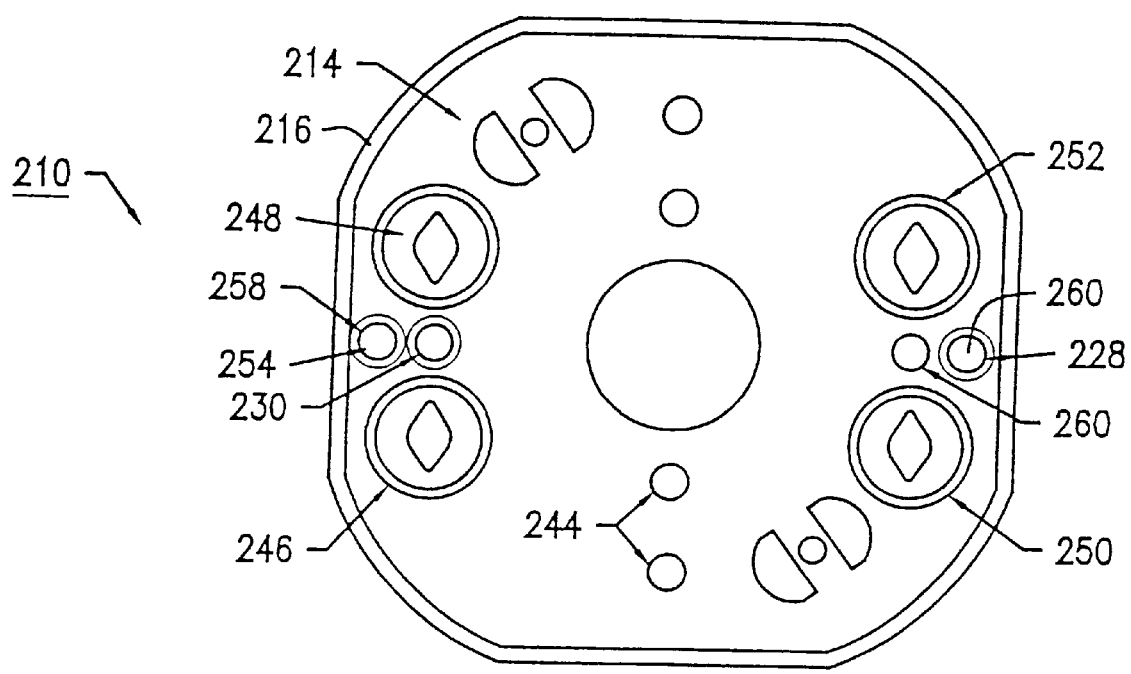
FIG 9 is a top plan view of the electrical outlet box of FIG. 7.

Referring now to FIGS. 7, 8, and 9, a metallic outlet box 210 and clamp 212 of the present invention are shown. Box 210 provides the installation flexibility of outlet box 110 while still meeting the stricter code requirements as does outlet box 10. Box 210 includes a bottom wall 214 that is perimetrically bounded by an upstanding sidewall 216 to define a box interior 218. Side wall 216 includes a first pair of loom holes 220 and 222 in spaced opposition across bottom wall 214 to a second pair of loom holes 224 and 226. Loom holes 220, 222, 224, and 226 are identical to the loom holes 26, 28, 20, and 24 in that each include a knockout 228, 230, 232, and 234, respectively, in registry therewith. Each knockout 228, 230, 232, and 234 similarly includes an aperture 236, 238, 240, and 242, respectively, therethrough. Side wall 216 may also include a plurality of mounting holes 244 for accommodating mounting hardware (not shown) such as screws or nails or the like for affixing box 210 to a stud, beam, or the like.

Bottom wall 214 also includes a plurality of mounting holes 244 for accommodating mounting hardware (not shown) to mount box 210 to a beam, joist, stud, or the like. Bottom wall 214 further includes loom holes 246 and 248 adjacent and normal to loom holes 220 and 222 of side wall 216. Bottom wall 214 also includes loom holes 250 and 252 adjacent and normal to loom holes 224 and 226. First clamp mounting holes 254 and 256 are positioned between loom holes 246, 248, and 250, 252, respectively for receiving clamp fastener screw 258 and 260, respectively. Second clamp mounting holes 258 and 260 are positioned between first clamp mounting holes 254 and 256, respectively, and sidewall 216. Clamp mounting holes 254, 256, 258, and 260 are positioned on bottom wall 214 so as to extend normal to, and in between, loom holes 220, 222, and 224, 226, respectively.

In non-industrial applications, clamp fastener screws 258 and 260 fasten clamps 162 and 264, respectively in box interior 218 thereby enabling clamps 162 to securely retain a conduit (not shown) inserted into box 210. The sloping angle of clamp face 166 of clamp 162 will pin an inserted conduit against side wall 216 when inserted through bottom wall 214 and against bottom wall 214 when inserted through side wall 216. Bottom wall 214 may also include screws 268 and 270 inserted therethrough.

For industrial applications, box 210 may employ clamp 212. With reference to FIG. 8, clamp 212 is formed from a stamped sheet of sheet metal. Clamp 212 provides variable closure of adjacent loom holes located on side wall 216 to effect clamping retention of a conduit inserted therethrough. With reference to FIG. 2, clamp 212 provides a footer 272, a front face 274, a clamp seat 276 and a head wall 278. Footer 272 extends the length of clamp 212 and defines a footer aperture 280 to be placed in registry with one of clamp mounting holes 254 or 256 on bottom wall 214. Conduit inserted through side wall 216 passes over footer 272. Footer 272 includes a first loom hole cover 282 and a second loom hole cover 284 which cover over those loom holes on bottom wall 214 adjacent to mounting holes 254 and 256.

Footer 272 is contiguous with front face 274 which is bent to extend substantially parallel to side wall 216. Front face 274 provides longitudinally opposed bracing legs 286a and 286b to either side of a central portion 288 to define conduit apertures 290 and 292 through which inserted conduit passes into interior 218. Front face 274 is bendably contiguous with head wall 278 via deflectable arms 294 and 296. In an undeflected condition, deflectable arms 294, 296 include a first portion 294a, 296a, which extends substantially perpendicular to both front face 274 and head wall 278, and a second portion 294b, 296b which extends substantially co-planar with head wall 278.

Clamp seat 276 protrudes substantially perpendicularly from head wall 278 towards front face 274. Clamp seat 276 includes a centrally-located seat aperture 298 in registry with footer aperture 280 for accommodating clamp fastener screws 258 and 260 in securing clamp 212 to box 210. Clamp seat 276 includes a pair of mounds 300a and 300b formed therein to generally conform to the outer surface of a conduit inserted though side wall 216.

In operation, clamp 212 may be loosely secured to bottom wall 214 by a clamp fastener screw so as to allow a conduit to be inserted through the adjacent loom holes. Once the conduit is inserted therepast, the clamp fastener screw may be further tightened down upon to deform clamp 212 into secure engagement with the inserted conduit. As the fastener screw is tightened, clamp seat 276 is driven towards the inserted conduit, causing deflectable arms 294 and 296 to deform and allow front face 274, clamp seat 276, and head wall 278 to generally maintain their undeflected alignment. Once the fastener screw is sufficiently tightened to secure the conduit between clamp seat 276 and bottom wall 214 the installer may proceed to other duties.

Box 210 overcomes the limitations of the prior art devices by employing clamp 212 to cover loom holes 220, 222, and 224, 226 through bottom wall 214 when box 210 is used in industrial applications. Bottom wall 214 includes a pair of first clamp mounting apertures 228 and 230 for accommodating a clamp such as clamp 162 of the prior art when box 210 is used in non-industrial applications, as such additional looms holes are acceptable under governing electrical codes. Box 210 may, however, still be used in industrial applications when employing clamp 212 because clamp 212 includes a first and second loom hole cover 282 and 284, respectively, so as to cover the loom holes 246 and 248, or 250 and 252 of bottom wall 214. Box 210 may therefore be used in both industrial and non-industrial applications by changing the clamp used for each application. Furthermore, box 210 achieves this dual-use characteristic without sacrificing the flexibility offered in non-industrial applications for inserting conduit through either bottom wall 214 or side wall 216. Electrical parts suppliers and installers now only need provide and keep in supply outlet box 210 and clamps 162 and 212 to meet the governing electrical codes for both industrial and non-industrial applications.

Box 210 of the present invention preferably also provides another benefit to the installer regarding the need to loosen clamp fastening screw 258 prior to inserting a conduit into box 210. Preferably, clamp fastening screw 258 is formed of a metal having a higher Brinell hardness than the material used to form outlet box 210. For example, whereas box 210 may be formed of a metal such as steel, clamp fastening screw 258 may be formed of a material such as case hardened steel. It is contemplated that during box fabrication, clamp mounting holes 228, 230, and 254, 256 may be formed having a smooth bore. Clamp fastening screw 258 may then be selected having a major diameter (i.e. across the threads) that is slightly larger than smooth bore holes 228, 230, and 254, 256. As clamp fastening screw 258 is augured into smooth bore holes 228, 230, or 254, 256, the threads of the screw will cut into the smooth bore thereby threading the bore. Furthermore, this method of inserting the fastening screws results in the screws being securely engaged within the clamp mounting holes without requiring the screw being fully augured in. Outlet box 210 may therefore be shipped with the clamp fastening screws in a position that enables a conduit be threaded into the outlet box without requiring the installer to lightening on the clamp by backing the fastening screw outwards. After mounting outlet box 210, the installer need only insert a conduit through a loom hole and tighten down upon the fastening screw to secure the conduit therein. The present invention therefore provides an outlet box assembly, and a method of forming the assembly that reduces the number of steps required of both the fabrication process and of the installer.

While the preferred embodiment of the present invention has been shown and described, it will be obvious in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An electrical junction box comprising:
   a bottom wall including a plurality of cable accommodating bottom wall openings;
   an upstanding side wall perimetrically bounding said bottom wall and including a plurality of cable accommodating side wall openings;
   said bottom wall and side wall defining a box interior; and
   a cable clamp adjustably mounted within said box interior, said cable clamp preventing passage of a cable through said bottom wall openings and allowing restricted passage of a cable through said side wall openings.

2. An electrical junction box of claim 1, wherein said bottom wall openings include a first pair of bottom wall openings and a second pair of bottom wall openings, each of said first and second pair being located adjacent said side wall and said first pair of bottom wall openings positioned oppositely across said bottom wall from said second pair of bottom wall openings.

3. An electrical junction box of claim 2, wherein said side wall openings comprise a first pair of side wall openings and a second pair of side wall openings, said first pair of side wall openings positioned oppositely across said box interior from said second pair of side wall openings.

4. An electrical junction box of claim 3, wherein said first pair of side wall openings is positioned adjacent said first pair of bottom wall openings and said second pair of side wall openings is positioned adjacent said second pair of bottom wall openings.

5. An electrical junction box of claim 4, further including a first clamp mounting aperture positioned between said first pair of bottom wall openings.

6. An electrical junction box of claim 5, further including a second clamp mounting aperture positioned adjacent said first clamp mounting aperture.

7. An electrical junction box of claim 6, wherein said cable clamp supports a clamp mounting screw and wherein one of said first clamp mounting aperture and said second clamp mounting aperture accommodates said clamp mounting screw for retaining said cable clamp within said box interior.

8. An electrical junction box of claim 7, wherein said junction box is formed of steel.

9. An electrical junction box of claim 8, wherein said clamp mounting screw is formed of case hardened steel for self-tapping insertion into one of the first or second clamp mounting apertures.

10. An electrical junction box of claim 1, wherein said cable clamp includes an elongate footer for positioning over said bottom wall openings, a front face defining a conduit aperture adjacent said footer for inserting said cable into said box interior, and a clamp seat deflectably spaced from said footer so as to allow said cable to pass between said footer and said clamp seat.

11. An electrical junction box of claim 10, wherein said front face generally maintains a perpendicular alignment with said footer as said clamp seat is deflected towards said footer.

12. An electrical junction box of claim 11, wherein said clamp seat and said footer define a pair of apertures in overlying registry to accept a clamp fastener screw for fastening said clamp to said bottom wall.

13. An electrical junction box of claim 12, wherein said clamp seat is deflectable towards said footer as said clamp fastener screw is advanced into said bottom wall.

14. A kit of parts for an electrical outlet box, said kit comprising:
   an electrical outlet box having a bottom wall including a plurality of cable accommodating bottom wall openings, an upstanding side wall perimetrically bounding said bottom wall and including a plurality of cable accommodating side wall openings, wherein said bottom wall and said side wall define a box interior;
   a first cable clamp adapted to be adjustably mountable within said box interior, said first cable clamp allowing restricted passage of a cable through said side wall openings and preventing passage of a cable through said bottom wall openings. covering said bottom wall openings.

15. A kit of parts of claim 14, wherein said cable clamp includes an elongate footer for positioning over said bottom wall openings, a front face defining a conduit aperture adjacent said footer for inserting said cable into said box interior, and a clamp seat delectably spaced from said footer so as to allow said cable to pass between said footer and said clamp seat.

16. A kit of parts of claim 15, wherein said front face generally maintains a perpendicular alignment with said footer as said clamp seat is deflected towards said footer.

17. A kit of parts of claim 16, wherein said clamp seat and said footer define a pair of apertures in overlying registry to accept a clamp fastener screw for fastening said clamp to said bottom wall.

18. A kit of parts of claim 17, wherein said clamp seat is deflectable towards said footer as said clamp fastener screw is advanced into said bottom wall.

19. A kit of parts of claim 14, further comprising a second cable clamp adapted to be adjustably mountable within said box interior, said second cable clamp allowing restricted passage of a cable through said bottom wall openings and said side wall openings.

\* \* \* \* \*